US010723463B1

(12) United States Patent
Plattner

(10) Patent No.: US 10,723,463 B1
(45) Date of Patent: Jul. 28, 2020

(54) SYSTEMS AND METHODS FOR EFFICIENT OPERATION OF AIR CYCLE MACHINES

(71) Applicant: Wesley M. Plattner, Tipton, MI (US)

(72) Inventor: Wesley M. Plattner, Tipton, MI (US)

(*) Notice: Subject to any disclaimer, the term of this patent is extended or adjusted under 35 U.S.C. 154(b) by 131 days.

(21) Appl. No.: 14/100,492

(22) Filed: Dec. 9, 2013

Related U.S. Application Data

(60) Provisional application No. 61/734,427, filed on Dec. 7, 2012.

(51) Int. Cl.
*F25D 9/00* (2006.01)
*B64D 13/08* (2006.01)
*B64D 13/04* (2006.01)

(52) U.S. Cl.
CPC ............. *B64D 13/08* (2013.01); *B64D 13/04* (2013.01)

(58) Field of Classification Search
CPC ........ B64D 13/06; B64D 13/04; B64D 33/08; B64D 2013/0618; B64D 2013/0648; B64D 2013/064; B64D 2013/0696
USPC ..................................................... 62/87, 402
See application file for complete search history.

(56) References Cited

U.S. PATENT DOCUMENTS

| | | | | |
|---|---|---|---|---|
| 4,262,495 A * | 4/1981 | Gupta | ................. | B64D 13/06 62/172 |
| 5,511,385 A * | 4/1996 | Drew | ................. | B64D 13/06 62/172 |
| 5,704,218 A * | 1/1998 | Christians | ............ | B64D 13/06 62/172 |
| 5,918,472 A | 7/1999 | Jonqueres | | |
| 5,939,800 A * | 8/1999 | Artinian | ................ | B64D 41/00 307/64 |
| 5,956,960 A * | 9/1999 | Niggeman | ............ | B64D 13/06 60/785 |
| 6,070,418 A * | 6/2000 | Crabtree | ................ | B64D 13/06 62/172 |
| 6,216,981 B1 * | 4/2001 | Helm | .................... | B64D 13/06 244/118.5 |
| 6,401,473 B1 | 6/2002 | Ng et al. | | |
| 6,427,474 B1 | 8/2002 | Ando et al. | | |
| 6,449,963 B1 | 9/2002 | Ng et al. | | |
| 6,672,541 B2 | 1/2004 | Fieldson et al. | | |
| 6,817,576 B2 | 11/2004 | Brady et al. | | |
| 6,845,630 B2 * | 1/2005 | Bruno | ................... | B64D 13/06 454/71 |
| 7,000,425 B2 * | 2/2006 | Army, Jr. | ............... | B64D 13/06 62/401 |
| 7,467,524 B2 * | 12/2008 | Brutscher | ............. | B64D 13/06 62/401 |
| 8,839,641 B1 * | 9/2014 | Plattner | ................. | B64D 13/06 62/401 |

(Continued)

Primary Examiner — Larry L Furdge
Assistant Examiner — Kirstin U Oswald
(74) Attorney, Agent, or Firm — Young Basile Hanlon & MacFarlane, P.C.

(57) ABSTRACT

A method for efficient operation of an environmental control system having a plurality of air cycle machines includes disabling operation of a first air cycle machine from the plurality of air cycle machines, enabling operation of one or more additional air cycle machines from the plurality of air cycle machines, monitoring at least one operating characteristic of the environmental control system, and resuming operation of the first air cycle machine upon determining that a condition has been satisfied based on the at least one operating characteristic of the environmental control system.

13 Claims, 4 Drawing Sheets

(56) References Cited

U.S. PATENT DOCUMENTS

| | | | |
|---|---|---|---|
| 2002/0162914 A1* | 11/2002 | Albero | B64D 13/06 244/53 R |
| 2002/0184902 A1* | 12/2002 | Rohrbach | B64D 13/06 62/175 |
| 2003/0177780 A1* | 9/2003 | Brutscher | B64D 13/06 62/401 |
| 2004/0194493 A1 | 10/2004 | Army, Jr. et al. | |
| 2007/0054610 A1* | 3/2007 | Jensen | B64D 37/32 454/74 |
| 2007/0266695 A1 | 11/2007 | Lui et al. | |
| 2007/0271952 A1* | 11/2007 | Lui | B64D 13/06 62/402 |

\* cited by examiner

SYSTEMS AND METHODS FOR EFFICIENT OPERATION OF AIR CYCLE MACHINES

CROSS-REFERENCE TO RELATED APPLICATIONS

This application claims the benefit of U.S. Provisional Patent Application Ser. No. 61/734,427, which was filed on Dec. 7, 2012.

FIELD OF THE INVENTION

The disclosure herein relates to the field of environmental control systems for aircraft, and more specifically, to systems and methods for efficient operation of air cycle machines.

BACKGROUND

Commercial aircraft typically include environmental control systems that regulate air supply, temperature, and cabin pressurization on the aircraft. Such environmental control systems may also be utilized to provide cooling to components of the aircraft itself, such as electrical systems. The environmental control system of most jet aircraft typically includes two or more air cycle machines, which provide pressurized air of an appropriate temperature to the cabin of the aircraft.

Air cycle machines typically operate using heated, pressurized bleed air that is diverted to the air cycle machines from the jet engines of the aircraft or from an auxiliary power unit of the aircraft. The air cycle machines typically also use ram air, which is ambient air that enters the aircraft through a ram scoop.

Typical air cycle machines include a turbine that is mechanically connected to a compressor, such that the turbine provides a rotational force to the compressor in order to operate the compressor. The turbine and compressor are selectively operable, and cooperate to reduce the temperature of the bleed air to allow cooling of the aircraft. Typical air cycle machines also include a heat exchanger that cools the bleed air using the ram air. Generally, the turbine and compressor are only used to cool the bleed air when the aircraft is on the ground, as the temperature of the ram air during flight is usually sufficient to cool the bleed air.

Diversion of the bleed air from the jet engines of the aircraft or from the auxiliary power unit of the aircraft accounts for a significant amount of fuel usage. It would be desirable to reduce the fuel usage attributable to operation of air cycle machines.

SUMMARY

Systems and methods for efficient operation of air cycle machines are disclosed herein.

One aspect of the disclosed embodiments is a method for efficient operation of an environmental control system having a plurality of air cycle machines. The method includes disabling operation of a first air cycle machine from the plurality of air cycle machines; enabling operation of one or more additional air cycle machines from the plurality of air cycle machines; monitoring at least one operating characteristic of the environmental control system; and resuming operation of the first air cycle machine upon determining that a condition has been satisfied based on the at least one operating characteristic of the environmental control system.

Another aspect of the disclosed embodiments is a method for efficient operation of an environmental control system having a plurality of air cycle machines. The method includes receiving a signal for commencing operation of all of the air cycle machines from the plurality of air cycle machines. In response to the signal for commencing operation of all of the air cycle machines, the method includes disabling operation of a first air cycle machine from the plurality of air cycle machines, enabling operation of all of one or more additional air cycle machines from the plurality of air cycle machines, monitoring an operating state of the one or more additional air cycle machines, and in response to monitoring the operating state of the one or more additional air cycle machines, enabling operation of the first air cycle machine if any of the additional air cycle machines from the plurality of air cycle machines ceases operation.

Another aspect of the disclosed embodiments is a method for efficient operation of an environmental control system having a first air cycle machine, a second air cycle machine, and a third air cycle machine. The method includes receiving a signal for commencing operation of the first air cycle machine, the second air cycle machine, and the third air cycle machine. In response to the signal for commencing operation of the first air cycle machine, the second air cycle machine, and the third air cycle machine, the method includes disabling operation of the first air cycle machine, enabling operation of the second air cycle machine and the third air cycle machine, monitoring an operating state of the second air cycle machine and an operating state of the third air cycle machine, and in response to monitoring the operating state of the second air cycle machine and the operating state of the third air cycle machine, enabling operation of the first air cycle machine if any of the first air cycle machine or the second air cycle machine ceases operation.

Another aspect of the disclosed embodiments is an environmental control system that includes a plurality of air cycle machines; a primary controller that outputs a signal for commencing operation of all of the air cycle machines from the plurality of air cycle machines; and a secondary controller that is electrically connected to the primary controller and to each air cycle machine from the plurality of air cycle machines. The secondary controller is operable to receive the signal for commencing operation of all of the air cycle machines from the primary controller, and is operable to cause operation of each air cycle machine from the plurality of air cycle machines. The secondary controller includes a first operating mode in which the secondary controller disables operation of a first air cycle machine from the plurality of air cycle machines and enabling operation of all of one or more additional air cycle machines from the plurality of air cycle machines in response to receiving the signal for commencing operation of all of the air cycle machines from the primary controller. The secondary controller includes a second operating mode in which the secondary controller causes operation of all of the air cycle machines from the plurality of air cycle machines in response to receiving the signal for commencing operation of all of the air cycle machines from the primary controller.

BRIEF DESCRIPTION OF THE DRAWINGS

The various other uses of the present invention will become more apparent by referring to the following detailed description and drawings in which.

DETAILED DESCRIPTION

Figure 1:
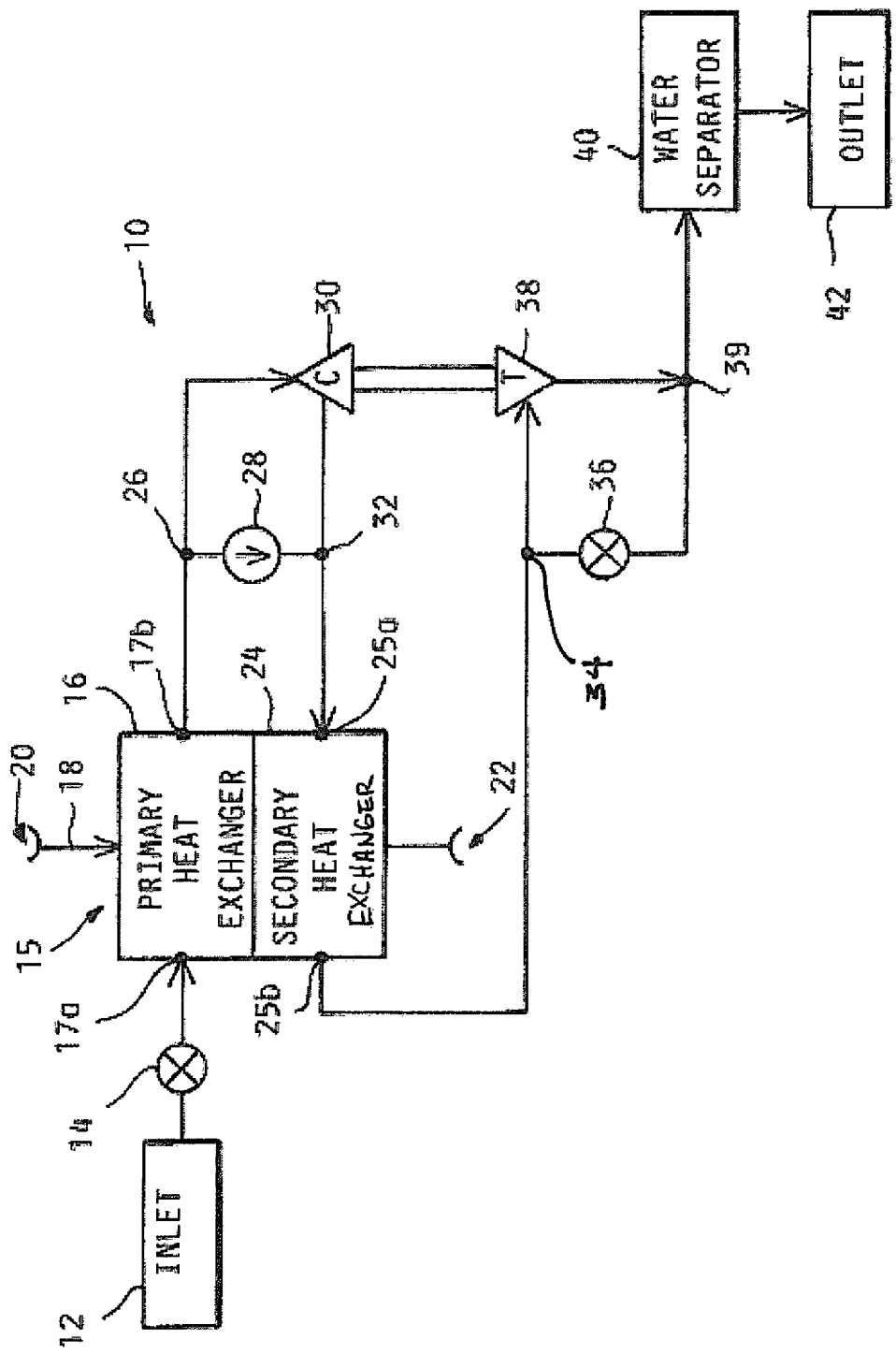
FIG. 1 is a block diagram showing a conventional air cycle machine of an aircraft.

Referring to the drawings, the present invention will now be described in detail with reference to the disclosed embodiment.

FIG. 1 shows a conventional air cycle machine 10, which is used to provide a fresh air supply, temperature control, and cabin pressurization in an aircraft (not shown). The air cycle machine 10 includes a bleed air inlet 12, which is typically connected to a source of heated, pressurized air, such as a bleed air port (not shown) that is provided in a compressor stage of one of the engines (not shown) of the aircraft. A flow control valve 14 is disposed downstream of the inlet 12 to control the quantity of bleed air introduced into the air cycle machine 10.

In order to cool the bleed air, the air cycle machine 10 includes a heat exchanger 15. The heat exchanger 15 has a primary stage 16 and a secondary stage 24. Cooling of the bleed air in the heat exchanger 15 is provided by a ram air stream 18. The ram air stream 18 enters the aircraft through a ram air scoop 20 and travels through the primary stage 16 of the heat exchanger 15 as well as the secondary stage 24 of the heat exchanger 15 before exiting the aircraft through a ram air outlet 22.

The bleed air enters the primary stage 16 of the heat exchanger 15 at a primary stage inlet 17a, downstream of the flow control valve 14. The bleed air is then cooled by the ram air stream 18 in the primary stage, before the heat exchanger 15 at a primary stage outlet 17b. Downstream of the primary stage 16 of the heat exchanger 15, the bleed air reaches a first junction 26, where the bleed air may either proceed through a one-way check valve 28 or through a compressor 30.

If the compressor 30 is operating, air is directed from the first junction 26 through the compressor 30, due to the low pressure condition present at the inlet of the compressor 30 when it is operating, and air is prevented from returning to the junction 26 from the high-pressure outlet of the compressor 30 by the check valve 28. In the compressor 30, the bleed air is compressed, thereby pressurizing and heating the bleed air. If the compressor 30 is not operating, the majority of the bleed air proceeds through the check valve 28, rather than past the non-operating compressor 30, as the bleed air traveling through the check valve 28 offers less resistance. However, a portion of the bleed air travels through the non-operating compressor 30, reducing the overall efficiency of the air cycle machine 10.

Downstream of both the check valve 28 and the compressor 30 is a second junction 32, where the bleed air streams from the check valve 28 and the compressor 30 to rejoin one another before entering the secondary stage 24 of the heat exchanger 15 at a secondary stage inlet 25a. In the secondary stage 24 of the heat exchanger 15, the bleed air is again cooled by the ram air stream 18 before exiting the heat exchanger 15 at a secondary stage outlet 25b.

Downstream of the secondary stage 24 of the heat exchanger 15, the bleed air reaches a third junction 34, where the air may proceed either to a bypass valve 36 or to a turbine 38 that is mechanically connected to the compressor 30. If the bypass valve 36 is open, the majority of the air proceeds through the bypass valve 36, as doing so offers less resistance than traveling through the turbine 38. However, some of the bleed air may still travel through the turbine 38 while the bypass valve 36 is open, but this amount of bleed air will not cause operation of the turbine 38. The bleed air then proceeds to a water separator 40 and then to an outlet 42. If the bypass valve 36 is closed, air proceeds through the turbine 38, causing rotation of the turbine, which expands and cools the bleed air. The bleed air then proceeds from the turbine 38 to the water separator 40 and the outlet 42.

In order to regulate operation of the air cycle machine 10, the flow control valve 14 can be electrically controlled by a control system (not shown) to vary the amount of bleed air received from the inlet 12. The bypass valve 36 can also be electrically operated by a control system (not shown) to selectively operate or bypass the turbine 38.

Figure 2:
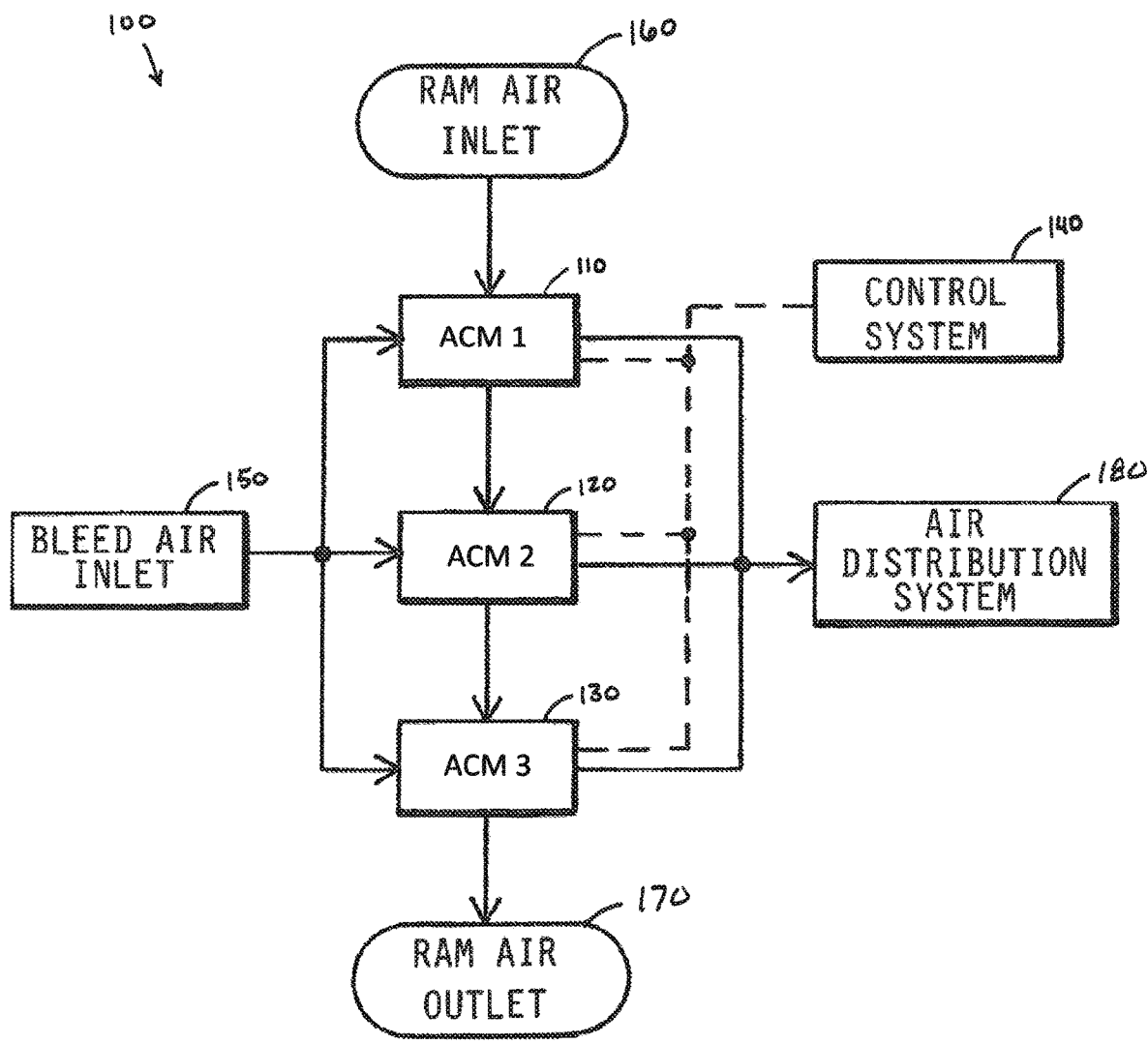
FIG. 2 is a block diagram showing an environmental control system of an aircraft that includes a plurality of air cycle machines and a control system.

FIG. 2 is a block diagram showing an environmental control system 100 of an aircraft that includes a plurality of air cycle machines, such as a first air cycle machine 110, a second air cycle machine 120, and a third air cycle machine 130, each of which can be configured in the manner described with respect to the conventional air cycle machine 10. The environmental control system 100 also includes a control system 140 that regulates operation of the first air cycle machine 110, the second air cycle machine 120, and the third air cycle machine 130.

The first air cycle machine 110, the second air cycle machine 120, and the third air cycle machine 130 are configured to receive bleed air from the engines of the aircraft, or from another bleed air source, at a bleed air inlet 150. The first air cycle machine 110, the second air cycle machine 120, and the third air cycle machine 130 are configured to receive ambient air from a ram air inlet 160. The excess ram air, once it is used by the first air cycle machine 110, the second air cycle machine 120, and the third air cycle machine 130, can exit the aircraft at a ram air outlet 170. The ram air and the bleed air can be used by the first air cycle machine 110, the second air cycle machine 120, and the third air cycle machine 130 to produce conditioned pressurized air, which is delivered to an air distribution system 180 for delivery to the cabin of the aircraft and/or to cool components of the aircraft such as electronics.

The control system 140 can operate the environmental control system 100 in a first operating mode or a second operating mode. The selection of the first operating mode or the second operating mode can be made based on a user input, such as operation of a switch, or can be made by the controller 140 based on environmental conditions, such as conditions inside of the aircraft and/or conditions outside of the aircraft.

The first operating mode of the environmental control system 100 can be a nominal operating mode in which all of the air cycle machines of the environmental control system 100 are operating, such as the first air cycle machine 110, the second air cycle machine 120, and the third air cycle machine 130.

The second operating mode of the environmental control system 100, which in some examples herein is described as an override mode, includes disabling operation of at least one air cycle machine from the plurality of air cycle machines of the environmental control system. In one example, operation of the first air cycle machine 110 is disabled while operation of all of the remaining air cycle machines is enabled. With reference to the illustrated example, operation of the second air cycle machine 120 and the third air cycle machine 130 would be enabled.

In another example, in the override mode of the environmental control system 100, the control system 140 maintains an appropriate supply of conditioned pressurized air to the air distribution system 180 by monitoring at least one operating characteristic of the environmental control system 100. As one example, at least one operating characteristic can include an operating state of the first air cycle machine 110, the second air cycle machine 120, and/or the third air cycle machine 130 that indicates whether the air cycle machines are currently operating, i.e. whether they are producing conditioned, pressurized air. As another example, at least one operating characteristic can include whether a request for increased volume operating mode has been requested. As another example at least one operating characteristic can include whether the aircraft is in the air or on the ground. As another example, at least one operating characteristic can include a volume, temperature, and/or pressure of the conditioned pressurized air that is delivered to the air distribution system. As another example, the operating characteristic can be a request for a high flow operating mode, which can be made, for instance, using a switch.

In one method of operating the environmental control system 100, the controller 140 disables operation of the first air cycle machine 110, and enables operation of all of the additional air cycle machines, namely the second air cycle machine 120 and the third air cycle machine 130. The controller 140 then monitors at least one operating characteristic of the environmental control system 100. Operation of the first air cycle machine 110 is resumed by the controller 140 upon determining that a condition has been satisfied based on the at least one operating characteristic of the environmental control system. In one example, the condition is whether either of the second air cycle machine 120 or the third air cycle machine 130 has ceased operating. In another example, the condition is whether the high flow operating mode has been requested. In another example, the condition is whether the aircraft is in the air or on the ground. In another example, the condition is whether at least one of the volume, temperature, and/or pressure of the conditioned pressurized air that is delivered to the air distribution system is within a target range.

Figure 3:
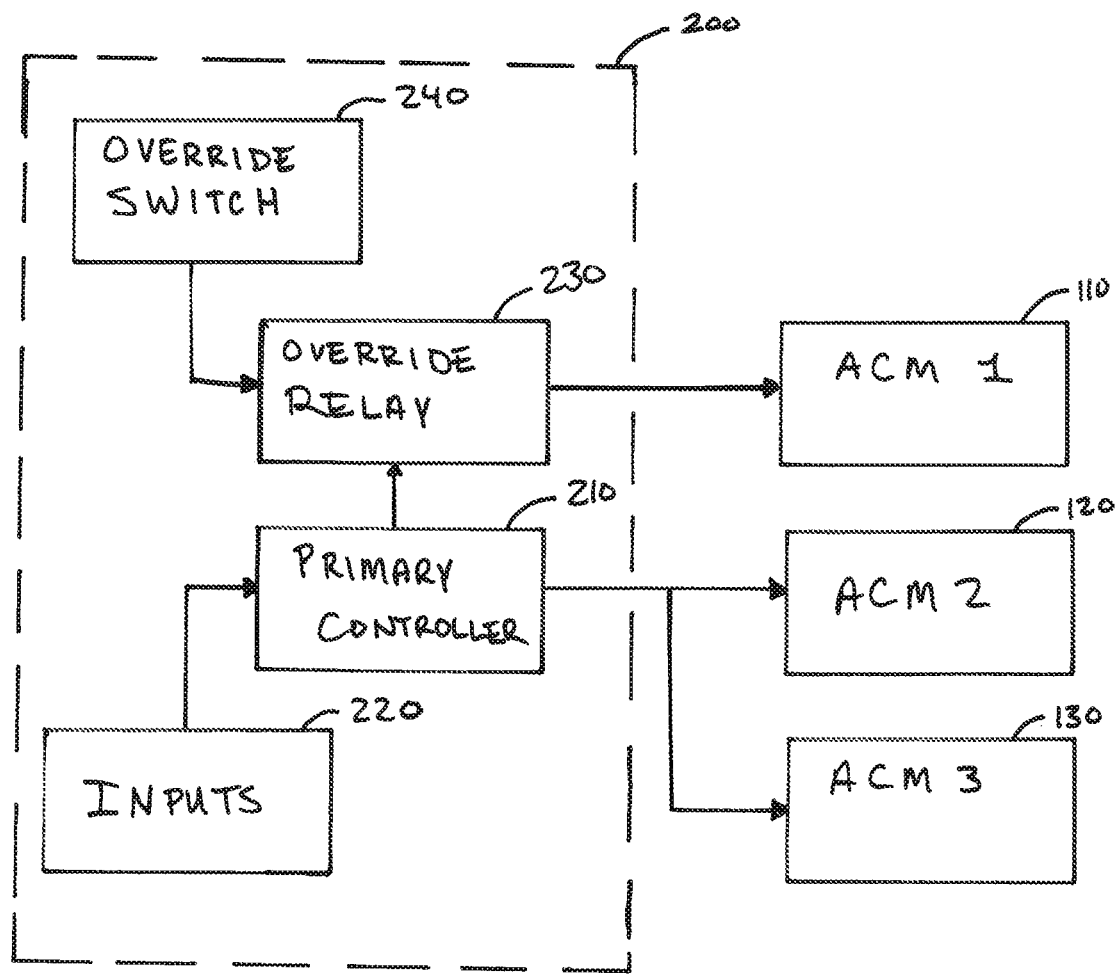
FIG. 3 is a block diagram showing a control system according to a first alternative example.

FIG. 3 shows a control system 200 according to a first alternative example that is connected to the first air cycle machine 110, the second air cycle machine 120, and the third air cycle machine 130, which are as described in connection with the environmental control system 100 of FIG. 1 and can be incorporated in such a system in the manner previously described.

The control system 200 includes a primary controller 210 that regulates operation of the first air cycle machine 110, the second air cycle machine 120, and the third air cycle machine 130 based on a plurality of inputs 220. Regulation of operation of the first air cycle machine 110, the second air cycle machine 120, and the third air cycle machine 130 can include generating operating signals for enabling or disabling operation of the first air cycle machine 110, the second air cycle machine 120, and the third air cycle machine 130. The inputs 220 can be in the form of signals and data, or in any other suitable form. At least some of the inputs 220 can be user provided inputs from a control device such as a switch or other user-operable interface device. At least some of the inputs 220 can be sensor-provided inputs that provide signals and or data representing operational characteristics of the environmental control system and/or the aircraft.

The primary controller 210 can be in communication with an override relay 230. When activated, the override relay 230 can suppress or change the operating signals issued by the primary controller 210. The override relay 230 can be activated or deactivated by any type of input or signal, which in one example is a signal from an override switch 240 that can be operated by a user to operate the environmental control system in the override mode. In one example, as illustrated in FIG. 3, the primary controller 210 directly regulates operation of the second air cycle machine 120 and the third air cycle machine 130, while the override relay 230 is interposed in communication between the primary controller 210 and the first air cycle machine 110, such that the primary controller 210 operates the first air cycle machine 110 via the override relay 230, so that the override relay can suppress or change the operating signals issued by the primary controller 210 to the first air cycle machine 110, when the override relay 230 is activated.

In one method, an override operating mode of the control system 200 includes generating, at the primary controller 210, an operating signal that requests operation of all of the air cycle machines, such as the first air cycle machine 110, the second air cycle machine 120, and the third air cycle machine 130. A signal for commencing operation of all of the air cycle machines is received at the override relay 230 and at the second air cycle machine 120 and the third air cycle machine 130. In response to the signal for commencing operation of all of the air cycle machines, the override relay 230 disables operation of the first air cycle machine 110. Operation of all of the other air cycle machines, such as the second air cycle machine 120 and the third air cycle machine 130, is enabled, and those air cycle machines begin normal operation including production of conditioned pressurized air. The override relay monitors an operating state of the additional air cycle machines, namely the second air cycle machine 120 and the third air cycle machine 130. The override relay can be configured to subsequently enable operation of the first air cycle machine 110 if any of the additional air cycle machines cease operation.

Figure 4:
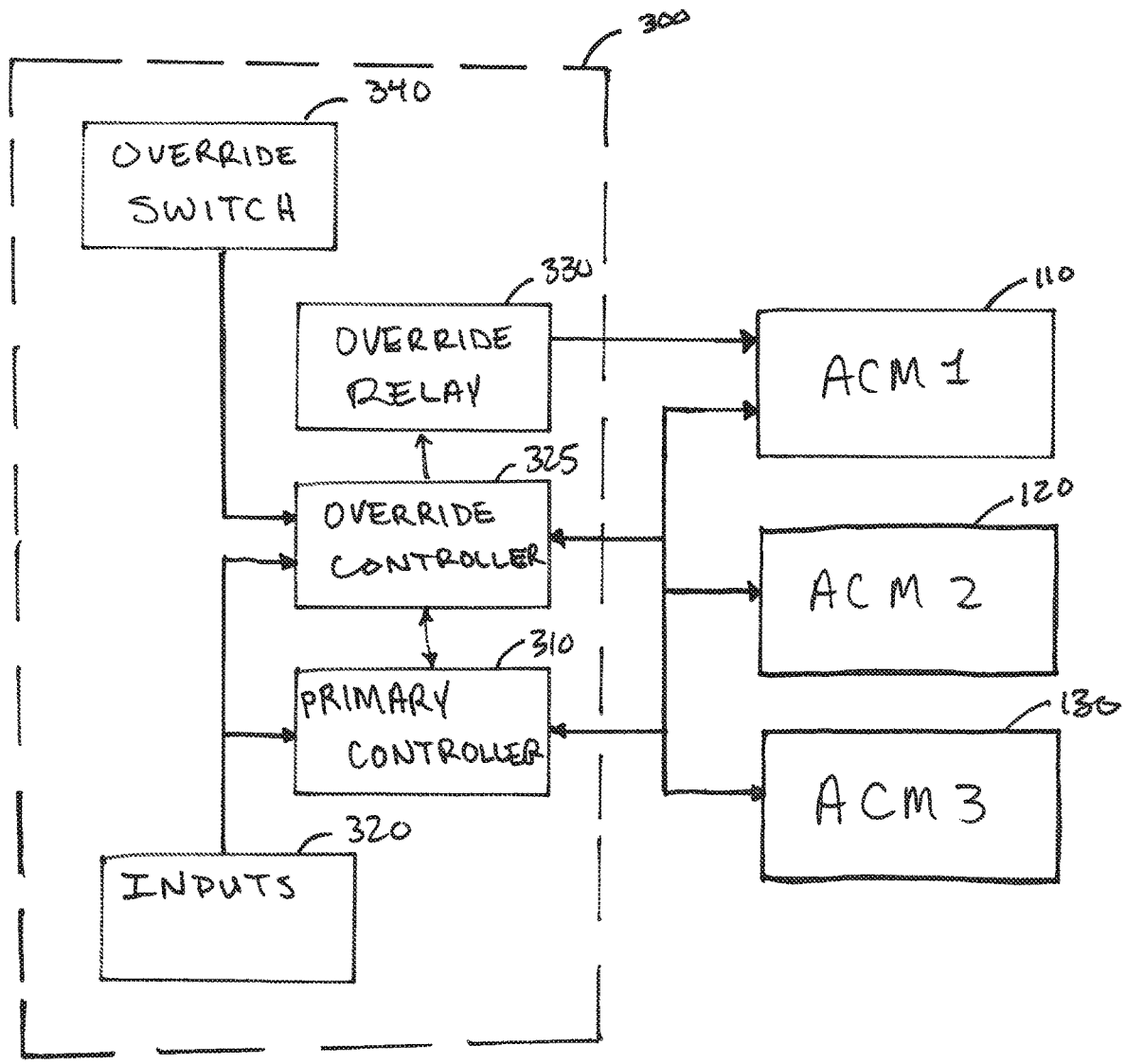
FIG. 4 is a block diagram showing a control system according to a second alternative example.

FIG. 4 shows a control system 300 according to a second alternative example that is connected to the first air cycle machine 110, the second air cycle machine 120, and the third air cycle machine 130, which are as described in connection with the environmental control system 100 of FIG. 1 and can be incorporated in such a system in the manner previously described.

The control system 300 includes a primary controller 310 that regulates operation of the first air cycle machine 110, the second air cycle machine 120, and the third air cycle machine 130 based on a plurality of inputs 320. Regulation of operation of the first air cycle machine 110, the second air cycle machine 120, and the third air cycle machine 130 can include generating operating signals for enabling or disabling operation of the first air cycle machine 110, the second air cycle machine 120, and the third air cycle machine 130. The inputs 320 can be in the form of signals and data, or in any other suitable form. At least some of the inputs 320 can be user provided inputs from a control device such as a switch or other user-operable interface device. At least some of the inputs 320 can be sensor-provided inputs that provide signals and or data representing operational characteristics of the environmental control system and/or the aircraft.

The primary controller 310 can be in communication with an override controller 325. The override controller 325 can receive the inputs 320 and is also in communication with the first air cycle machine 110, the second air cycle machine 120, and the third air cycle machine 130 to monitor and or regulate their operation. The override controller 325 can receive input signals from and send operating signals to the second air cycle machine 120 and the third air cycle machine 130. For example, the override controller 325 can switch the second air cycle machine 120 and the third air cycle machine 130 from a high flow operation mode to a low flow operation mode in which the volumetric output of conditioned pressurized air is reduced, in response to one of the inputs 320, such as an input indicating that the aircraft is in the air or has reached a cruising condition.

The override controller 325 is in communication with an override relay 330 that can suppress or change the operating signals issued by the primary controller 210, for example, in order to disable operation of the first air cycle machine 110, in the manner described in connection with the control system 200. The override relay 330 can be activated or deactivated by any type of input or signal, which in one example is a signal from an override switch 340 that can be operated by a user to operate the environmental control system in the override mode.

In operation, the control system 300 can be operated in the manner described previously with respect to the systems shown in FIGS. 2-3.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for efficient operation of an environmental control system in an aircraft, the steps comprising:
   providing a plurality of air cycle machines, wherein each air cycle machine has a separate primary heat exchanger for receiving heated pressurized air and a ram air stream, a separate compressor for heating and pressurizing the air from the primary heat exchanger, a separate secondary heat exchanger for receiving air from the compressor, a separate turbine for expanding and cooling the air from the secondary heat exchanger, and a separate water separator for removing water from the air;
   operating the environmental control system between a nominal operating mode, wherein all of the air cycle machines are operating, and an override mode, wherein at least one of the air cycle machines is disabled;
   monitoring the at least one operating characteristic of the environmental control system;
   resuming operation of the at least one air cycle machine upon determining that a condition has been satisfied based on the at least one operating characteristic of the environmental control system,
   wherein the first air cycle machine from the plurality of air cycle machines includes a bleed air inlet for receiving heated pressurized air, a flow control valve for controlling a quantity of the air admitted via the bleed air inlet, a ram air inlet for directing a ram air stream to the primary heat exchanger, a check valve for directing bleed air from the primary heat exchanger directly to the secondary heat exchanger when the compressor is not operating; and a bypass valve for directing bleed air from the secondary heat exchanger directly to the water separator when the turbine is not operating.

2. The method of claim 1, wherein the at least one operating characteristic indicates whether each air cycle machine from the one or more additional air cycle machines is currently operating.

3. The method of claim 2, wherein the condition is satisfied if at least one air cycle machine from the one or more additional air cycle machines is not operating.

4. The method of claim 1, wherein the at least one operating characteristic indicates whether an increased volume operating mode has been requested.

5. The method of claim 4, wherein the condition is satisfied if the increased volume operating mode has been requested.

6. The method of claim 1, wherein the at least one operating characteristic indicates whether operation of the environmental control system is in the air or on the ground.

7. The method of claim 1, wherein the at least one operating characteristic includes a volume of conditioned pressurized air that is delivered to an air distribution system.

8. The method of claim 7, wherein the condition is satisfied if the volume of the conditioned pressurized air is outside of a desired volume range.

9. The method of claim 1, wherein the at least one operating characteristic includes a pressure of the conditioned pressurized air that is delivered to an air distribution system.

10. The method of claim 9, wherein the condition is satisfied if the pressure of the conditioned pressurized air is outside of a desired pressure range.

11. The method of claim 1, wherein the at least one operating characteristic includes a temperature of the conditioned pressurized air that is delivered to an air distribution system.

12. The method of claim 1, wherein the condition is satisfied if a temperature of the conditioned pressurized air is outside of a desired temperature range.

13. A method for efficient operation of an environmental control system in an aircraft, the steps comprising:
   providing a plurality of air cycle machines, wherein each air cycle machine has a separate primary heat exchanger for receiving heated pressurized air and a ram air stream, a separate compressor for heating and pressurizing the air from the primary heat exchanger, a separate secondary heat exchanger for receiving air from the compressor, a separate turbine for expanding and cooling the air from the secondary heat exchanger, and a separate water separator for removing water from the air;
   regulating the operation of the plurality of air cycle machines by generating operating signals for enabling and disabling operating the plurality of air cycle machines;
   monitoring the at least one operating characteristic of the environmental control system;
   resuming operation of the at least one air cycle machine upon determining that a condition has been satisfied based on the at least one operating characteristic of the environmental control system, and
   wherein the first air cycle machine from the plurality of air cycle machines includes a bleed air inlet for receiving heated pressurized air, a flow control valve for controlling a quantity of the air admitted via the bleed air inlet, a ram air inlet for directing a ram air stream to the primary heat exchanger, a check valve for directing bleed air from the primary heat exchanger directly to the secondary heat exchanger when the compressor is not operating; and a bypass valve for directing bleed air from the secondary heat exchanger directly to the water separator when the turbine is not operating.

\* \* \* \* \*